United States Patent
Yu et al.

(10) Patent No.: US 12,035,380 B2
(45) Date of Patent: Jul. 9, 2024

(54) INDUSTRIAL 5G DYNAMIC MULTI-PRIORITY MULTI-ACCESS METHOD BASED ON DEEP REINFORCEMENT LEARNING

(71) Applicant: SHENYANG INSTITUTE OF AUTOMATION, CHINESE ACADEMY OF SCIENCES, Liaoning (CN)

(72) Inventors: Haibin Yu, Liaoning (CN); Xiaoyu Liu, Liaoning (CN); Chi Xu, Liaoning (CN); Peng Zeng, Liaoning (CN); Xi Jin, Liaoning (CN); Changqing Xia, Liaoning (CN)

(73) Assignee: SHENYANG INSTITUTE OF AUTOMATION, CHINESE ACADEMY OF SCIENCES, Liaoning (CN)

( * ) Notice: Subject to any disclaimer, the term of this patent is extended or adjusted under 35 U.S.C. 154(b) by 476 days.

(21) Appl. No.: 17/296,509

(22) PCT Filed: Dec. 25, 2020

(86) PCT No.: PCT/CN2020/139322
§ 371 (c)(1),
(2) Date: May 24, 2021

(87) PCT Pub. No.: WO2021/227508
PCT Pub. Date: Nov. 18, 2021

(65) Prior Publication Data
US 2022/0217792 A1 Jul. 7, 2022

(30) Foreign Application Priority Data
May 9, 2020 (CN) .......................... 202010385640.4

(51) Int. Cl.
*H04W 74/08* (2024.01)
*G06N 3/04* (2023.01)
(Continued)

(52) U.S. Cl.
CPC ........ *H04W 74/0875* (2013.01); *G06N 3/045* (2023.01); *H04L 5/003* (2013.01); *H04W 74/002* (2013.01)

(58) Field of Classification Search
CPC .......... G06N 3/08; G06N 3/006; G06N 3/044; G06N 3/045; G06N 7/01; H04L 5/003;
(Continued)

(56) References Cited

U.S. PATENT DOCUMENTS 10,979,625 B2 * 4/2021 Lee ..................... H04N 23/632
11,328,329 B1 * 5/2022 Roberts ................. G06N 20/00
(Continued)

FOREIGN PATENT DOCUMENTS

CN 110035478 A * 7/2019
CN 110557769 A 12/2019
(Continued)

OTHER PUBLICATIONS

Lv et al, "A kind of dynamic multi-channel cut-in method under high-speed mobile scene" (CN 110035478A); Jul. 19, 2019; [Machine Translation] pp. 1-7. (Year: 2019).*

*Primary Examiner* — Liton Miah
(74) *Attorney, Agent, or Firm* — NKL Law; Allen Xue

(57) ABSTRACT

An industrial 5G dynamic multi-priority multi-access method based on deep reinforcement learning includes the following steps: establishing an industrial 5G network model; establishing a dynamic multi-priority multi-channel access neural network model based on deep reinforcement learning; collecting state, action and reward information of multiple time slots of all industrial 5G terminals in the
(Continued)

industrial 5G network as training data; training the neural network model by using the collected data until the packet loss ratio and end-to-end latency meet industrial communication requirements; collecting the state information of all the industrial 5G terminals in the industrial 5G network at the current time slot as the input of the neural network model; conducting multi-priority channel allocation; and conducting multi-access by the industrial 5G terminals according to a channel allocation result. The method allocates multiple channels to the industrial 5G terminals of different priorities in the industrial 5G network in real time to ensure large-scale concurrent access.

8 Claims, 3 Drawing Sheets

(51) Int. Cl.
*G06N 3/045* (2023.01)
*H04L 5/00* (2006.01)
*H04W 74/00* (2009.01)

(58) Field of Classification Search
CPC .............. H04L 5/0037; H04W 74/002; H04W 74/0875; H04W 24/02; H04W 72/04
See application file for complete search history.

(56) References Cited

U.S. PATENT DOCUMENTS

| | | | | |
|---|---|---|---|---|
| 11,663,472 | B2* | 5/2023 | Wang | H04W 24/02 |
| | | | | 706/25 |
| 11,928,587 | B2* | 3/2024 | Wang | G06N 3/045 |
| 2019/0014488 | A1* | 1/2019 | Tan | G06N 3/044 |
| 2019/0149425 | A1* | 5/2019 | Larish | G06N 3/045 |
| | | | | 706/16 |
| 2020/0366385 | A1* | 11/2020 | Ge | G06N 3/084 |
| 2021/0186329 | A1* | 6/2021 | Tran | A61B 7/04 |

FOREIGN PATENT DOCUMENTS

| | | |
|---|---|---|
| CN | 110691422 A | 1/2020 |
| CN | 110856268 A | 2/2020 |
| CN | 111628855 A | 9/2020 |
| WO | 2020032594 A1 | 2/2020 |

* cited by examiner

INDUSTRIAL 5G DYNAMIC MULTI-PRIORITY MULTI-ACCESS METHOD BASED ON DEEP REINFORCEMENT LEARNING

TECHNICAL FIELD

The present invention provides an industrial 5G dynamic multi-priority multi-channel access method based on deep reinforcement learning, which aims at the requirements of large-scale distributed industrial 5G terminal concurrent communication and ultra-reliable and low latency communication (URLLC) in industrial 5G networks and considers the problems of modeling difficulty and state space explosion of algorithms in traditional methods caused by the different requirements of massive industrial data transmission for timeliness and reliability. The present invention particularly relates to packet loss rate and end-to-end latency constraints of industrial 5G terminals, and belongs to the technical field of the industrial 5G networks.

BACKGROUND

With the development of Industry 4.0, a large number of distributed industrial 5G terminals are interconnected, thereby generating massive data with different requirements for real-time and reliable transmission. In order to realize flexible and customizable intelligent manufacturing process, an industrial wireless network is used between distributed industrial 5G terminals to realize data communication. Timeliness and reliability are the most important quality of service requirements for data communication. The industrial 5G network has become a communication enabling technology of the industrial wireless network with performance guarantee of URLLC and large-scale inter-machine communication.

Multi-channel access allows large-scale concurrent access of the industrial 5G terminals, which can effectively increase spectrum utilization efficiency. However, traditional multi-channel access algorithms are generally based on known system models. For industrial scenarios of large-scale inter-machine communication, the number and data of the industrial 5G terminals are time-varying, and it is difficult to obtain an accurate system model. URLL of data transmission is the most important quality of service requirements in industrial communication. Data generated by the industrial 5G terminals have time-varying requirements for timeliness and reliability of transmission. However, in the traditional industrial production process, the priority of the terminals is generally constant, and it is difficult to guarantee the timeliness and reliability transmission requirements of massive time-varying data.

For large-scale dynamic multi-priority multi-channel access of the industrial 5G terminals, not only an accurate system model is difficult to obtain, but also the state space explosion of the algorithms is caused. Deep reinforcement learning can use deep learning to estimate the system model and solve dynamic multi-priority multi-channel access in combination with reinforcement learning, thereby effectively solving the problems of difficult modeling of the system model and the state space explosion.

SUMMARY

To achieve the above invention purpose, the purpose of the present invention is to provide an industrial 5G network dynamic multi-priority multi-access method based on deep reinforcement learning, which aims at the requirements of large-scale distributed industrial 5G terminal concurrent communication and URLLC in industrial 5G networks and considers the problems of modeling difficulty and state space explosion of algorithms in traditional methods caused by the different requirements of massive industrial data transmission for timeliness and reliability, to realize dynamic multi-priority multi-access of the industrial 5G terminals under specific packet loss rate and end-to-end latency constraints.

For large-scale dynamic multi-priority multi-channel access of the industrial 5G terminals, not only an accurate system model is difficult to obtain, but also the state space explosion of the algorithms is caused. Deep reinforcement learning can use deep learning to estimate the system model and solve dynamic multi-priority multi-channel access in combination with reinforcement learning, thereby effectively solving the problems of difficult modeling of the system model and the state space explosion.

The present invention adopts the following technical solution: an industrial 5G dynamic multi-priority multi-access method based on deep reinforcement learning is provided. For an industrial 5G network, channel allocation is realized by training a neural network model, comprising the following steps:

1) establishing a dynamic multi-priority multi-channel access neural network model based on deep reinforcement learning;

2) collecting state, action and reward information of T time slots of all industrial 5G terminals in the industrial 5G network as training data to train the neural network model;

3) collecting the state information of all the industrial 5G terminals in the industrial 5G network at the current time slot as the input of the neural network model; conducting multi-priority channel allocation through the neural network model; and conducting multi-access by the industrial 5G terminals according to a channel allocation result.

The industrial 5G network comprises: one industrial 5G base station, one edge computing server and N industrial 5G terminals;

the edge computing server is connected with the industrial 5G base station for training the neural network model of deep reinforcement learning;

the industrial 5G base station downloads the trained neural network model from the edge computing server for scheduling the dynamic multi-priority multi-channel access of the industrial 5G terminals;

the industrial 5G terminals are connected with the industrial 5G base station through the industrial 5G network for generating industrial data with different transmission requirements.

For the industrial 5G network, an industrial 5G network model is established, comprising: determining a coverage range of the industrial 5G network and the number N of the industrial 5G terminals within the range, the number P of priorities of the industrial 5G terminals and the number C of channels.

The step of establishing a dynamic multi-priority multi-channel access neural network model based on deep reinforcement learning is as follows:

constructing two neural network models with the same structure of q-eval deep neural network and q-next deep neural network, and neural network parameters params=$[x_{in}, x_{mn}, x_{fc}, x_{out}, w, b]$ wherein $x_{in}$ represents the number of neurons on an input layer and is equal to the length of a state vector $s_n$ of the industrial 5G terminal n ($n \in N$); N represents the number of the industrial 5G terminals; $x_{mn}$ represents the number of neurons on a recurrent neural network layer; $x_{fc}$ represents the number of neurons on a fully connected layer; $x_{out}$ represents the number of neurons on an output layer and is equal to the length of an action vector $a_n$ of the industrial 5G terminal n; w represents a weight; and b represents an offset;

wherein the q-eval deep neural network is used for obtaining a valuation function $Q(s_n, a_n)$ of the action vector $a_n$ of the current state vector $s_n$ of the industrial 5G terminal n; the q-next neural network model is used for selecting the valuation function $\max_{a'_n} Q(s'_n, a'_n)$ of the maximum action vector $a'_n$ of the next state vector $s'_n$ of the industrial 5G terminal n;

updating the q-eval deep neural network parameters w and b using reinforcement learning $Q(s_n, a_n)=Q(s_n, a_n)+\alpha(r_n+\gamma \max_{a'_n} Q(s'_n, a'_n) Q(s_n, a_n))$, wherein $\alpha$ represents a learning rate; $\gamma$ represents a discount ratio, and $r_n$ represents a reward obtained by the industrial 5G terminal n in the current state $s_n$ by executing the action vector $a_n$;

the initialization parameters of the q-next deep neural network being the same as the initialization parameters of the q-eval deep neural network; updating the parameters w and b of the q-eval deep neural network after each iterative training of the neural network model, and updating the parameters w and b of the q-next deep neural network once after each iterative training of the neural network model for I times.

The training data comprises:

a state vector $s_n(t)=[c_n(t), ack_n(t), p_n(t), cf(t)]$ of the industrial 5G terminal n in a time slot t ($t \in T$), wherein $c_n(t)$ represents a channel $c(c \in C)$ selected by the industrial 5G terminal n at the beginning of the time slot t; $ack_n(t)$ represents whether the data is successfully sent by the industrial 5G terminal n at the end of the time slot t; $p_n(t)$ represents a priority $p(p \in P)$ of the industrial 5G terminal n at the time slot t; and cf(t) represents $a_n$ occupation rate of all channels c in the time slot t;

an action vector $a_n(t)=[a_n^c(t)]$ of the industrial 5G terminal n in a time slot t, wherein $a_n^c(t)$ represents an allocated channel $c(c \in C)$ of the industrial 5G terminal n in the time slot t;

a reward vector $r_n(t)=[a_n^c(t)]$ of the industrial 5G terminal n in the time slot t, wherein $r_n(t)$ represents a reward obtained by the industrial 5G terminal n at the end of the time slot t.

The training of the neural network model comprises the following steps:

(1) inputting the state vector $s_n(t)=[c_n(t), ack_n(t), p_n(t), cf(t)]$ of the industrial 5G terminal n in the time slot t into the q-eval deep neural network;

(2) selecting the action vectors through the q-eval deep neural network: selecting the action vector according to $\varepsilon$-greedy algorithm, and randomly selecting the action vector with probability $\varepsilon$, i.e., a channel, or selecting the action vector with the probability 1-$\varepsilon$ to obtain a maximum valuation function (i.e., $\max_{a_n(t)} Q(s_n(t), a_n(t))$), i.e., a channel;

(3) obtaining a reward $r_n(t)$ and observation $o_n(t)$ according to the action vector $a_n(t)$;

(4) obtaining a state vector $s'_n(t+1)$ of the industrial 5G terminal n in a next time slot t+1 according to the state vector $s_n(t)$ and the action vector $a_n(t)$ of the industrial 5G terminal n in the time slot t; storing $<s_n(t), a_n(t), r_n(t), s'_n(t+1)>$ as experience of an experience pool; and using $<s_n(t), a_n(t), r_n(t), s'_n(t+1)>$ of each time slot as an experience;

(5) inputting $s'_n(t+1)$ into the q-next deep neural network to obtain $\max_{a'_n(t+1)} Q(s'_n(t+1), a'_n(t+1))$ and a target estimated value $Q_{target}=r_n(t)+\gamma \max_{a'_n(t+1)} Q(s'_n(t+1), a'_n(t+1))$;

(6) randomly selecting M experiences from the experience pool through an experience replay method; calculating $Q_{target}$ and $\max_{a_n(t)} Q(s_n(t), a_n(t))$ of each experience, and updating parameters w and b of the q-eval deep neural network according to a mean square error loss function $$Loss(\theta(t)) = \frac{\sum_{i=1}^{M}(Q_{target}(\theta(t)) - \max_{a_n(t)} Q(s_n(t), a_n(t), \theta(t)))^2}{M}$$

and gradient descend $$\theta_n(t+1) = \theta_n(t) - \eta \frac{\partial Loss(\theta(t))}{\partial(\theta(t))},$$

wherein $\eta$ represents the learning rate of the neural network, and $\theta(t)$ represents a neural network hyperparameter of the time slot t;

(7) copying the parameters w and b of the q-eval deep neural network to the q-next deep neural network after repeatedly iterating the q-eval deep neural network for I times;

(8) repeatedly iterating (1)-(7) until the mean square error loss function converges, and using the obtained q-eval deep neural network as the trained neural network model.

After the trained neural network model is obtained, the neural network model is optimized:

collecting the state information of historical time slots of all the industrial 5G terminals in the industrial 5G network, and obtaining a multi-priority channel allocation result through the neural network model; using the neural network model as a final trained neural network model for final multi-priority channel allocation when the network performance of the allocation result meets the requirements, i.e., when the packet loss ratio, the system global packet loss ratio and the end-to-end latency are less than corresponding network performance indexes;

otherwise, repeating steps 1)-2) until the neural network model meets the requirements.

The network performance indexes comprise:
the packet loss ratio $$\rho_n^c(t) = \lambda_n^c(t) \frac{\hat{l}_n^c(t) - \vec{l}_n^c(t)}{\hat{l}_n^c(t)},$$

wherein $\lambda_n^c(t)$ represents whether channel c is allocated to the industrial 5G terminal n in the time slot t; $\lambda_n^c(t)$ is relevant to the priority p of the industrial 5G terminal n; $\hat{l}_n^c(t)$ represents the number of data packets to be transmitted by the industrial 5G terminal n on the channel c at the beginning of the time slot t; and $\vec{l}_n^c(t)$ represents the number of data packets successfully transmitted by the industrial 5G terminal n on the channel c at the end of the time slot t;

the system overall packet loss ratio $$\rho(t) = \frac{\sum_{n=1}^{N}(\hat{l}_n(t) - \vec{l}_n(t))}{\sum_{n=1}^{N}(\hat{l}_n(t))},$$

wherein $$\sum_{n=1}^{N} \vec{l}_n(t)$$

represents the number of data packets successfully transmitted by all N industrial 5G terminals in time slot t and $$\sum_{n=1}^{N} \hat{l}_n(t)$$

represents the number of data packets waiting for transmission by all N industrial 5G terminals in the time slot t;

end-to-end latency defined as $D_n^{e2e} = d_n^{prop} + d_n^{tran} + d_n^{que} + d_{hw}$, wherein $d_n^{prop}$ is defined as the propagation latency of the industrial 5G terminal n, i.e., the latency experienced by electromagnetic waves from a sending end of one industrial 5G terminal to a receiving end of another industrial 5G terminal; $d_n^{tran}$ is defined as the transmission latency of the industrial 5G terminal n, i.e., the latency experienced from the transmission of the first bit of the data packet to the transmission of the last bit; $d_n^{que}$ is defined as the queuing latency of the industrial 5G terminal n, i.e., the latency experienced by the data packet from arrival at the industrial 5G terminal to departure from the industrial 5G terminal; $d_{hw}$ is defined as hardware latency, i.e., the latency caused by the hardware performance of the industrial 5G terminal.

The step of collecting the state information of all the industrial 5G terminals in the current industrial 5G network as the input of the neural network model and conducting multi-priority channel allocation through the neural network model comprises the following steps:

collecting the state vector $$\sum_{n=1}^{N} s_n(t) = [s_1(t), s_2(t), \ldots, s_{N-1}(t), s_N(t)]$$

of all N industrial 5G terminals in the industrial 5G network in the current time slot t as the input of the trained neural network model to obtain an output action vector $$\sum_{n=1}^{N} a_n(t) = [a_1(t), a_2(t), \ldots, a_{N-1}(t), a_N(t)];$$

scheduling an industrial 5G terminal access channel by an industrial base station according to the obtained output action vector.

An industrial 5G dynamic multi-priority multi-access system based on deep reinforcement learning comprises:

an edge computing server for establishing and training a dynamic multi-priority multi-channel access neural network model based on deep reinforcement learning;

industrial 5G terminals for generating industrial data with different transmission requirements and collecting state information, action information and reward information of the terminals;

an industrial 5G base station for downloading the trained neural network model and using the state information of the industrial 5G terminals as the input of the neural network model for conducting multi-priority channel allocation through the neural network model.

The present invention has the following beneficial effects and advantages:

1. Aiming at the URLLC requirements of industrial 5G, the present invention maps the time variation of timeliness and reliability required by data transmission of the industrial 5G terminals to the dynamic priority of the industrial 5G terminals, uses the dynamic multi-priority multi-channel access algorithm based on deep reinforcement learning to solve the problems of modeling difficulty and state space explosion of the algorithm in traditional methods caused by communication of large-scale distributed industrial 5G terminals and different massive requirements for timeliness and reliability in the industrial 5G network, and effectively ensures reliable transmission of high real-time data and channel access allocation between industrial 5G terminals of different priorities.

2. The present invention has strong commonality and practicability, can adaptively treat the change of the industrial 5G terminals and channels, can effectively ensure the dynamic multi-priority multi-access of the industrial 5G terminals, realizes stable transmission under the constraints of specific packet loss ratio and end-to-end latency, and improves system safety and stability.

DETAILED DESCRIPTION

The present invention will be described in detail below in combination with the drawings.

The present invention relates to an industrial 5G network technology, comprising the following steps: establishing an industrial 5G network model, and determining the number of industrial 5G terminals, priorities and the number of channels; establishing a dynamic multi-priority multi-channel access neural network model based on deep reinforcement learning, and initializing model parameters; collecting state, action and reward information of multiple time slots of all industrial 5G terminals in the industrial 5G network as training data; training the neural network model by using the collected data until the packet loss ratio and end-to-end latency meet industrial communication requirements; collecting the state information of all the industrial 5G terminals in the industrial 5G network at the current time slot as the input of the neural network model; conducting multi-priority channel allocation; and conducting multi-access by the industrial 5G terminals according to a channel allocation result. With respect to the requirements of large-scale distributed industrial 5G terminal concurrent communication and URLLC in the industrial 5G networks, the present invention invents a dynamic multi-priority multi-channel access algorithm based on deep reinforcement learning. The method fully considers the problems of modeling difficulty and state space explosion of the algorithm in traditional methods caused by the different requirements of massive industrial data transmission for timeliness and reliability, and can efficiently allocate multiple channels to the industrial 5G terminals of different priorities in real time to ensure large-scale concurrent access.

Figure 1:
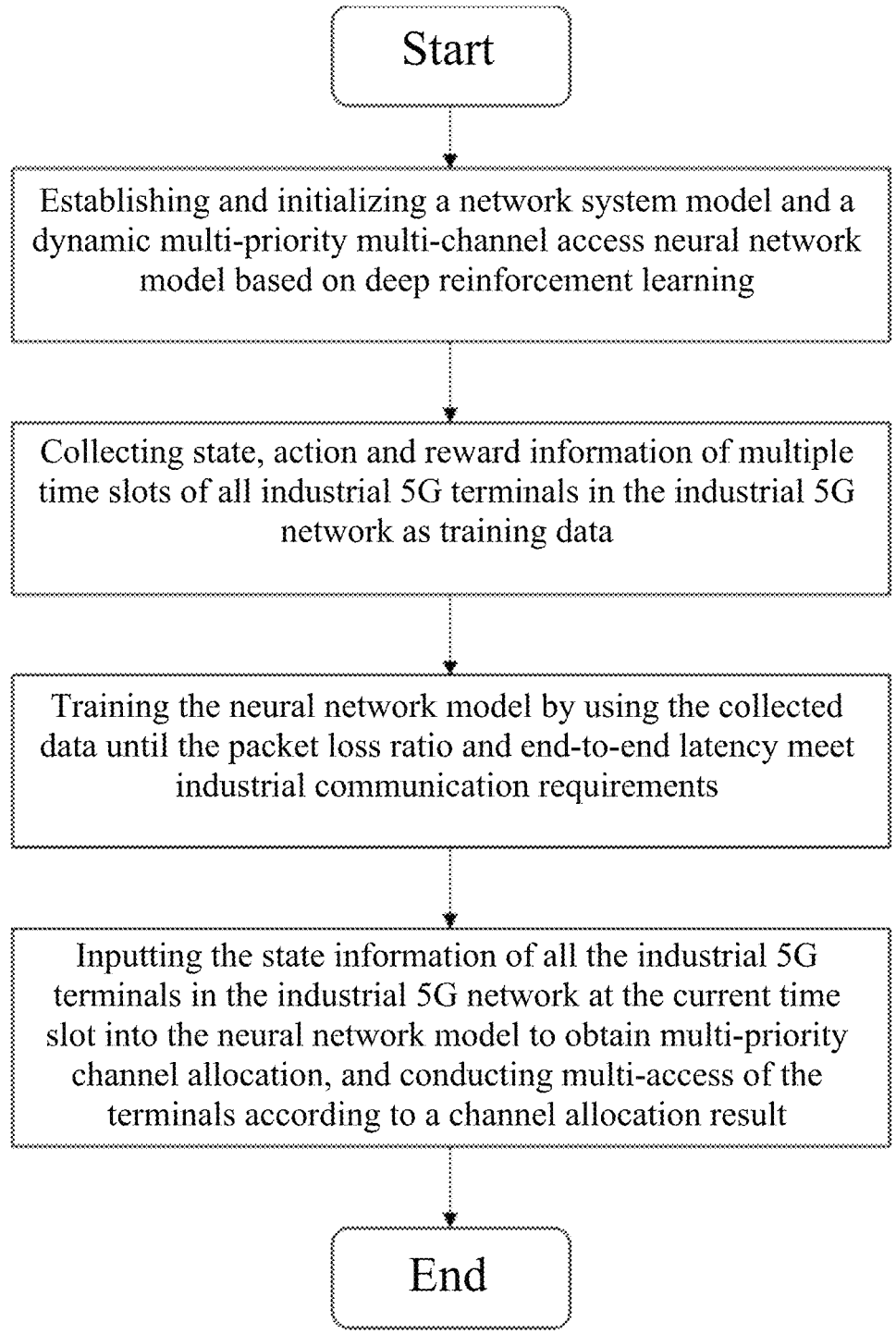
FIG. 1 is a flow chart of a method of the present invention.

The present invention mainly comprises the following realization process, as shown in FIG. 1, which comprises the following steps:

step 1: establishing an industrial 5G network model, and determining the number of industrial 5G terminals, priorities and the number of channels;

step 2: establishing a dynamic multi-priority multi-channel access neural network model based on deep reinforcement learning, and initializing model parameters;

step 3: collecting state, action and reward information of T time slots of all industrial 5G terminals in the industrial 5G network as training data;

step 4: training the neural network model by using the collected training data until the packet loss ratio and end-to-end latency meet industrial communication requirements;

step 5: collecting the state information of all the industrial 5G terminals in the industrial 5G network at the current time slot as the input of the neural network model; conducting multi-priority channel allocation; and conducting multi-access by the industrial 5G terminals according to a channel allocation result.

Figure 2:
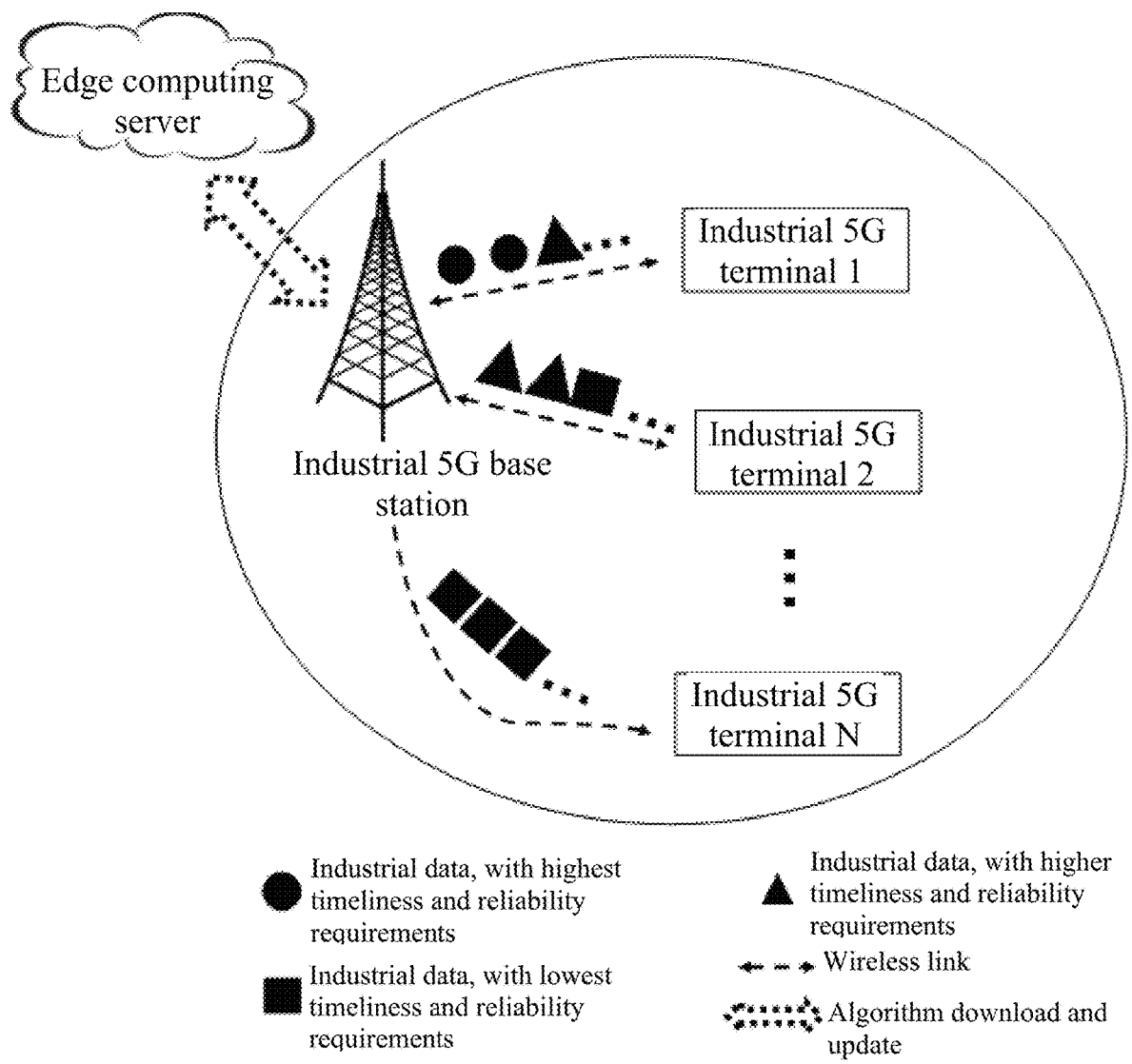
FIG. 2 is a system model diagram.

The embodiment is implemented according to the process shown in FIG. 1, and comprises the following specific steps:

1: establishing an industrial 5G network model, as shown in FIG. 2, and determining the number of industrial 5G terminals, priorities and the number of channels:

(1) The industrial 5G network comprises: one industrial 5G base station, one edge computing server and N industrial 5G terminals, wherein the edge computing server is connected with the industrial 5G base station for training the neural network model of deep reinforcement learning; the industrial 5G base station downloads the updated and trained neural network model from the edge computing server for scheduling the dynamic multi-user priority multi-channel access; and the industrial 5G terminals are connected with the industrial 5G base station through the industrial 5G network for generating industrial data with different transmission requirements.

(2) Determining a coverage range of the industrial 5G network and the number N of the industrial 5G terminals within the range, the number P of priorities of the industrial 5G terminals and the number C of channels, wherein priority P is relevant to the timeliness and reliability of data transmission. The higher the timeliness and reliability transmission requirements are, the higher the priorities of the industrial 5G terminals are. The industrial 5G network model mainly comprises two situations: the number N of industrial equipment is less than the number C of the channels, and the number N of the industrial equipment is greater than or equal to the number C of the channels.

Figure 3:
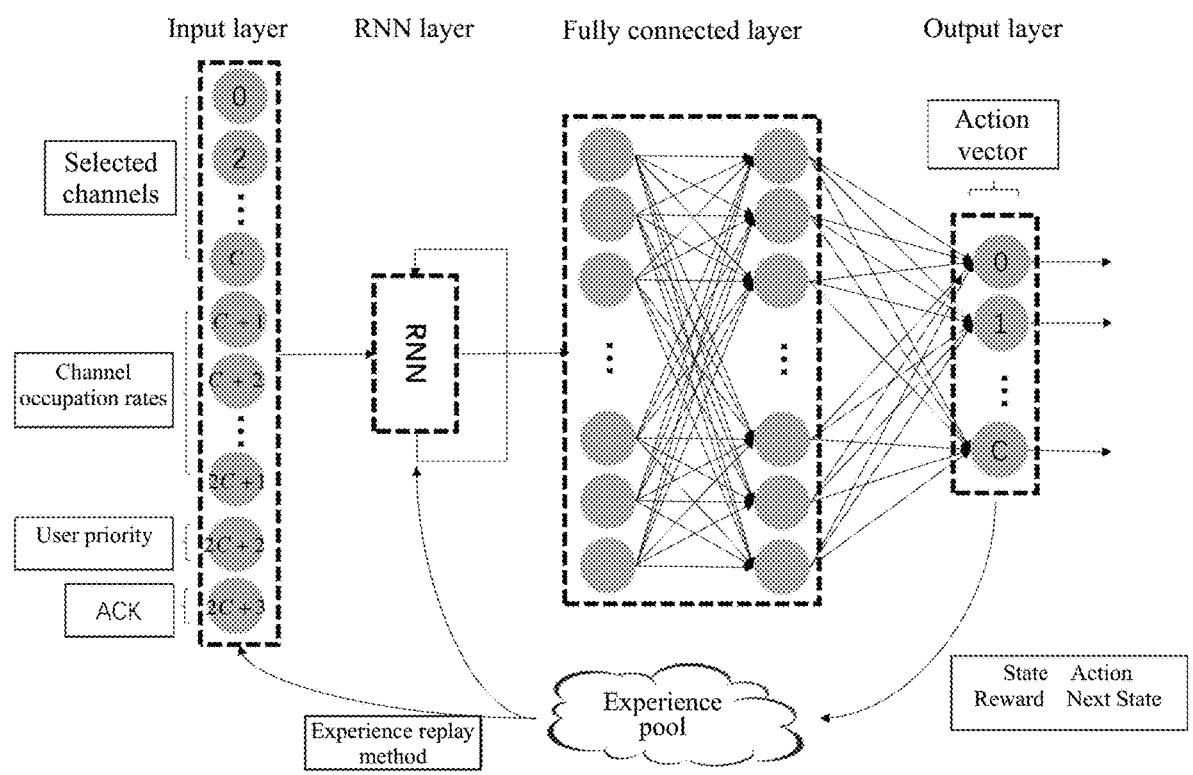
FIG. 3 is an architecture diagram of deep reinforcement learning.

2. Establishing a dynamic multi-priority multi-channel access neural network model based on deep reinforcement learning, and initializing model parameters, as shown in FIG. 3, comprising the following steps:

(1) establishing a dynamic multi-priority multi-channel access neural network model based on deep reinforcement learning, comprising an input layer, a recurrent neural network (RNN) layer, a fully connected layer and an output layer;

(2) initializing parameters params=$[x_{in}, x_{mn}, x_{fc}, x_{out}, w, b]$ of the deep neural network, wherein $x_{in}$ represents the number of neurons on the input layer and is equal to the length of a state vector $s_n$ of the industrial 5G terminal n($n \in N$); N represents the number of the industrial 5G terminals; $x_{mn}$ represents the number of neurons on the recurrent neural network layer; $x_{fc}$ represents the number of neurons on the fully connected layer; $x_{out}$ represents the number of neurons on the output layer and is equal to the length of $a_n$ action vector $a_n$ of the industrial 5G terminal n; w represents a weight; and b represents an offset;

(3) constructing two deep neural networks with the same structure: q-eval and q-next, wherein the q-eval deep neural network is used for obtaining a valuation function $Q(s_n, a_n)$ of the action vector $a_n$ of the current state vector $s_n$ of the industrial 5G terminal n($n \in N$); the q-next deep neural network updates the parameters of the q-eval deep neural network through reinforcement learning $Q(s_n, a_n)=Q(s_n, a_n)+\alpha(r_n+\gamma \max_{a'_n}Q(s'_n, a'_n)-Q(s_n, a_n))$ by selecting the valuation function $\max_{a'_n}Q(s'_n, a'_n)$ of the maximum action vector $a'_n$ of the next state vector $s'_n$ of the industrial 5G terminal n, wherein $\alpha$ represents a learning rate; $\gamma$ represents a discount ratio, and $r_n$ represents a reward obtained by the industrial 5G terminal n in the current state $s_n$ by executing the action vector $a_n$; the initialization parameters of the q-next deep neural network is the same as the initialization parameters of the q-eval deep neural network; updating the parameters w and b of the q-eval deep neural network after each iterative training of the neural network model, and updating the parameters w and b of the q-next deep neural network once after each iterative training of the neural network model for I times.

3: Collecting state, action and reward information of T time slots of all industrial 5G terminals in the industrial 5G network as training data, comprising:

(1) a state vector $s_n(t)=[c_n(t), ack_n(t), p_n(t), cf(t)]$ of the industrial 5G terminal n ($n \in N$) in a time slot t($t \in T$), wherein $c_n(t)$ represents a channel selected by the industrial 5G terminal n at the time slot t, with a vector $V_c$ of C+1, i.e., when the industrial 5G terminal n selects a channel c, the c+1th value of $V_c$ is 1 and other values are 0; when the industrial 5G terminal n chooses not to transmit the channel, the 0th value of $V_c$ is 1, and other values are 0; $ack_n(t)$ represents whether the industrial 5G terminal n has successfully sent the data at the end of the time slot t, $ack_n(t)=0$ represents that the industrial 5G terminal n fails to send the data at the time slot t; $ack_n(t)=1$ represents that the industrial 5G terminal n successfully sends the data at the time slot t; $ack_n(t)$ is obtained from the observation $o_n(t)$; $p_n(t)$ represents the priority of the industrial 5G terminal n in the time slot t, which is determined by the timeliness and reliability requirements of the data to be transmitted by the industrial 5G terminal n in the time slot t; the higher the timeliness and reliability requirements of the data are, the smaller the value of $p_n(t)$ is and the higher the priority is. cf(t) represents the occupation rate of all the channels c in the time slot t, with a vector $V_{cf}$ of C+1, i.e., whenever an industrial 5G terminal selects a channel c for transmission, the c+1th value of $V_{cf}$ is added by 1, and whenever an industrial 5G terminal chooses not to transmit the channel, the 0th value of $V_{cf}$ is added by 1; higher value of the channel c indicates that more industrial 5G terminals select the channel c;

(2) an action vector $a_n(t)=[a_n^c(t)]$ of the industrial 5G terminal n in the time slot t, wherein $a_n^c(t)$ is a vector $V_n^c$ of C+1. When the industrial 5G terminal n is allocated with the channel c (c∈C) to transmit data in the time slot t, the valuation function of the c+1th $V_n^c$ is largest; when the industrial 5G terminal n is allocated not to send data in the time slot t, the valuation function of the 0th $V_n^c$ is largest;

(3) a reward vector $r_n(t)=[r_n(t)]$ of the industrial 5G terminal n in the time slot t, wherein $r_n(t)$ represents a reward obtained by the industrial 5G terminal n at the end of the time slot t, and the reward value is relevant to the success of data transmission and the priority of the industrial 5G terminal. If the industrial 5G terminal n fails to send data in the time slot t, the industrial 5G terminal n receives a negative reward regardless of the priority of the industrial 5G terminal; and if the industrial 5G terminal n successfully sends data in the time slot t, the higher the priority of the industrial 5G terminal is, the higher the reward obtained by the industrial 5G terminal n is, which is positive.

4. Training the neural network model by using the collected data until the packet loss ratio and end-to-end latency meet industrial control communication requirements, wherein the training process of the neural network comprises the following steps:

(1) inputting the state vector $s_n(t)=[c_n(t), ack_n(t), p_n(t), cf(t)]$ of the industrial 5G terminal n in the time slot t into the q-eval deep neural network;

(2) selecting the action vector according to ε-greedy algorithm, setting a probability ε, and randomly selecting the action vector with probability ε, i.e., a channel, or selecting the action vector with the probability 1-ε to obtain a maximum valuation function (i.e., $\max_{a_n(t)} Q(s_n(t), a_n(t))$), i.e., a channel;

(3) computing the obtained reward $r_n(t)$ and observation on $o_n(t)$ according to the action vector $a_n(t)$;

(4) obtaining a state vector $s'_n(t+1)$ of the industrial 5G terminal n in a next time slot t+1 according to the state vector $s_n(t)$ and the action vector $a_n(t)$ of the industrial 5G terminal n in the time slot t; storing $<s_n(t), a_n(t), r_n(t), s'_n(t+1)>$ as experience of an experience pool; and using $<s_n(t), a_n(t), r_n(t), s'_n(t+1)>$ of each time slot as an experience;

(5) inputting $s'_n(t+1)$ into the q-next deep neural network to obtain $\max_{a'_n(t+1)} Q(s'_n(t+1), a'_n(t+1))$ and a target estimated value $Q_{target}=r_n(t)+\gamma \max_{a'_n(t+1)} Q(s'_n(t+1), a'_n(t+1))$;

(6) randomly selecting M experiences from the experience pool through an experience replay method; calculating $Q_{target}$ and $\max_{a_n(t)} Q(s_n(t), a_n(t))$ of each experience, and updating parameters w and b of the q-eval deep neural network according to a mean square error loss function $$Loss(\theta(t)) = \frac{\sum_{i=1}^{M}(Q_{target}(\theta(t))-\max_{a_n(t)} Q(s_n(t), a_n(t), \theta(t)))^2}{M}$$

and gradient descend $$\theta_n(t+1) = \theta_n(t) - \eta \frac{\partial Loss(\theta(t))}{\partial(\theta(t))},$$

wherein η represents the learning rate of the neural network, and θ(t) represents a neural network hyperparameter of the time slot t;

(7) copying the parameters w and b of the q-eval deep neural network to the q-next deep neural network after repeatedly iterating the q-eval deep neural network for I times;

(8) repeatedly iterating (1)-(7) until the mean square error loss function converges.

5. Training the neural network model by using the collected data until the packet loss ratio and end-to-end latency meet industrial control communication requirements, wherein the performance indexes of the packet loss ratio and end-to-end latency comprise:

(1) $\lambda_n^c(t)$ represents whether the channel c is allocated to the industrial 5G terminal n in the time slot t. $\lambda_n^c(t)=0$ represents that the channel c is not allocated to the industrial 5G terminal n in the time slot t, and $\lambda_n^c(t)=1$ represents that the channel c is allocated to the industrial 5G terminal n in the time slot t. High-priority industrial 5G terminals can have a high probability of accessing the channel to transmit data, while low-priority industrial 5G terminals have a low probability of accessing the channel to transmit data, that is, the higher the priority of the industrial 5G terminals n is, the higher the probability of $\lambda_n^c(t)=1$ is.

(2) It is assumed that the channel capacity is sufficient to meet the transmission requirements of maximum data packets of the industrial 5G terminals. When the number of the industrial 5G terminals N is less than or equal to the number C of the channels, all the industrial 5G terminals can access the channel to transmit data, and the packet loss ratio of the industrial 5G terminals n is $\rho_n^c(t)=0$; and when the number N of the industrial 5G terminals is greater than the number C of the channels, the packet loss ratio of the industrial 5G terminal n is $$\rho_n^c(t) = \lambda_n^c(t) \frac{\hat{l}_n^c(t) - \vec{l}_n^c(t)}{\hat{l}_n^c(t)};$$

the higher the priority p of the industrial 5G terminal n is, the higher the probability of $\lambda_n^c(t)=1$ is. $\hat{l}_n^c(t)$ represents the number of data packets to be transmitted by the industrial 5G terminal n on the channel c at the beginning of the time slot t; and $\vec{l}_n^c(t)$ represents the number of data packets successfully transmitted by the industrial 5G terminal n on the channel c at the end of the time slot t;

(3) It is assumed that the channel capacity is sufficient to meet the transmission requirements of maximum data packets of the terminals. When the number of the industrial 5G terminals N is less than or equal to the number C of the channels, all the industrial 5G terminals can access the channel to transmit data, and the system global packet loss ratio is ρ(t)=0; when the number N of the industrial 5G terminals is greater than the number C of the channels, the system global packet loss ratio is $$\rho(t) = \frac{\sum_{n=1}^{N}(\hat{l}_n(t) - \vec{l}_n(t))}{\sum_{n=1}^{N}(\hat{l}_n(t))},$$

wherein $$\sum_{n=1}^{N}\hat{l}_n(t)$$

represents the number of data packets successfully transmitted by all N industrial 5G terminals in time slot t and $$\sum_{n=1}^{N}\vec{l}_n(t)$$

represents the number of data packets waiting for transmission by all N industrial 5G terminals in the time slot t.

(4) End-to-end latency is defined as $D_n^{e2e} = d_n^{prop} + d_n^{tran} + d_n^{que} + d_{hw}$, wherein $d_n^{prop}$ is defined as the propagation latency of the industrial 5G terminal n, i.e., the latency experienced by electromagnetic waves from a sending end to a receiving end; $d_n^{tran}$ is defined as the transmission latency of the industrial 5G terminal n, i.e., the latency experienced from the transmission of the first bit of the data packet to the transmission of the last bit; $d_n^{que}$ is defined as the queuing latency of the industrial 5G terminal n, i.e., the latency experienced by the data packet from arrival at the industrial 5G terminal to departure from the industrial 5G terminal; the higher the priority p of the industrial 5G terminal n is, the smaller the queuing latency is; $d_{hw}$ is defined as hardware latency, i.e., the latency caused by the hardware performance of the industrial 5G terminal.

(5) It is judged whether $\rho_n^c(t)$, $\rho(t)$ and $D_n^{e2e}$ meet the performance requirements under a specific system model; if so, the model training is completed; otherwise, the model is continuously trained until the performance requirements are met.

6. Collecting the state information of all the industrial 5G terminals in the industrial 5G network in the current time slot as the input of the neural network model and conducting multi-priority channel allocation. The industrial 5G terminals conduct multi-access according to the channel allocation result, comprising:

(1) collecting the state vector $$\sum_{n=1}^{N}s_n(t) = [s_1(t), s_2(t), \ldots, s_{N-1}(t), s_N(t)]$$

of all N industrial 5G terminals in the industrial 5G network in the current time slot t as the input of the trained neural network model to obtain an output action vector $$\sum_{n=1}^{N}a_n(t) = [a_1(t), a_2(t), \ldots, a_{N-1}(t), a_N(t)];$$

(2) centrally scheduling an industrial 5G terminal access channel by an industrial base station according to the obtained output action vector.

The invention claimed is:

1. An industrial 5G dynamic multi-priority multi-access method based on deep reinforcement learning, comprising the following steps:
   1) establishing a dynamic multi-priority multi-channel access neural network model based on deep reinforcement learning;
   2) collecting state, action and reward information of T time slots of all industrial 5G terminals in the industrial 5G network as training data to train the neural network model; and
   3) collecting the state information of all the industrial 5G terminals in the industrial 5G network at the current time slot as the input of the neural network model; conducting multi-priority channel allocation through the neural network model; and conducting multi-access by the industrial 5G terminals according to a channel allocation result,
   wherein step 1 further comprises:
constructing two neural network models with the same structure of q-eval deep neural network and q-next deep neural network, and neural network parameters params=$[x_{in}, x_{mn}, x_{fc}, x_{out}, w, b]$,
   wherein $x_{in}$ represents the number of neurons on an input layer and is equal to the length of a state vector $s_n$ of the industrial 5G terminal n (n∈N), N represents the number of the industrial 5G terminals, $x_{mn}$ represents the number of neurons on a recurrent neural network layer, $x_{fc}$ represents the number of neurons on a fully connected layer, $x_{out}$ represents the number of neurons on an output layer and is equal to the length of an action vector $a_n$ of the industrial 5G terminal n, w represents a weight, and b represents an offset,
   wherein the q-eval deep neural network is used for obtaining a valuation function $Q(s_n, a_n)$ of the action vector $a_n$ of the current state vector $s_n$ of the industrial 5G terminal n, the q-next neural network model is used for selecting the valuation function $\max_{a'_n}Q(s'_n, a'_n)$ of the maximum action vector $a'_n$ of the next state vector $s'_n$ of the industrial 5G terminal n;
   updating the q-eval deep neural network parameters w and b using reinforcement learning $Q(s_n, a_n) = Q(s_n, a_n) + \alpha(r_n + \gamma \max_{a'_n}Q(s'_n, a'_n) - Q(s_n, a_n))$, wherein α represents a learning rate; γ represents a discount ratio, and $r_n$ represents a reward obtained by the industrial 5G terminal n in the current state $s_n$ by executing the action vector $a_n$,
   the initialization parameters of the q-next deep neural network being the same as the initialization parameters of the q-eval deep neural network; updating the parameters w and b of the q-eval deep neural network after each iterative training of the neural network model, and updating the parameters w and b of the q-next deep neural network once after each iterative training of the neural network model for I times.

2. The industrial 5G dynamic multi-priority multi-access method based on deep reinforcement learning according to claim 1, wherein the industrial 5G network comprises: one industrial 5G base station, one edge computing server and N industrial 5G terminals,
   wherein the edge computing server is connected with the industrial 5G base station for training the neural network model of deep reinforcement learning, the industrial 5G base station downloads the trained neural network model from the edge computing server for scheduling the dynamic multi-priority multi-channel access of the industrial 5G terminals, and the industrial 5G terminals are connected with the industrial 5G base station through the industrial 5G network for generating industrial data with different transmission requirements.

3. The industrial 5G dynamic multi-priority multi-access method based on deep reinforcement learning according to claim 1, wherein an industrial 5G network model is established by a method comprising: determining a coverage range of the industrial 5G network and the number N of the industrial 5G terminals within the range, the number P of priorities of the industrial 5G terminals and the number C of channels.

4. The industrial 5G dynamic multi-priority multi-access method based on deep reinforcement learning according to claim 1, wherein the training data comprises:

a state vector $s_n(t)=[c_n(t), ack_n(t), p_n(t), cf(t)]$ of the industrial 5G terminal n in a time slot t ($t \in T$), wherein $c_n(t)$ represents a channel $c(c \in C)$ selected by the industrial 5G terminal n at the beginning of the time slot t, $ack_n(t)$ represents whether the data is successfully sent by the industrial 5G terminal n at the end of the time slot t, $p_n(t)$ represents a priority $p(p \in P)$ of the industrial 5G terminal n at the time slot t, and cf(t) represents an occupation rate of all channels c in the time slot t;

an action vector $a_n(t)=[a_n^c(t)]$ of the industrial 5G terminal n in a time slot t, wherein $a_n^c(t)$ represents an allocated channel $c(c \in C)$ of the industrial 5G terminal n in the time slot t; and a reward vector $r_n(t)=[r_n(t)]$ of the industrial 5G terminal n in the time slot t, wherein $r_n(t)$ represents a reward obtained by the industrial 5G terminal n at the end of the time slot t.

5. The industrial 5G dynamic multi-priority multi-access method based on deep reinforcement learning according to claim 1, wherein the training of the neural network model in step 2 comprises the following steps:

(1) inputting the state vector $s_n(t)=[c_n(t), ack_n(t), p_n(t), c_f(t)]$ of the industrial 5G terminal n in the time slot t into the q-eval deep neural network;

(2) selecting the action vectors through the q-eval deep neural network: selecting the action vector according to ε-greedy algorithm, and randomly selecting the action vector with probability ε, i.e., a channel, or selecting the action vector with the probability 1-ε to obtain a maximum valuation function (i.e., $\max_{a_n(t)} Q(s_n(t), a_n(t))$), i.e., a channel;

(3) obtaining a reward $r_n(t)$ and observation $o_n(t)$ according to the action vector $a_n(t)$;

(4) obtaining a state vector $s'_n(t+1)$ of the industrial 5G terminal n in a next time slot t+1 according to the state vector $s_n(t)$ and the action vector $a_n(t)$ of the industrial 5G terminal n in the time slot t; storing $<S_n(t), a_n(t), r_n(t), s'_n(t+1)>$ as experience of an experience pool; and using $<S_n(t), a_n(t), r_n(t), s'_n(t+1)>$ of each time slot as an experience;

(5) inputting $s'_n(t+1)$ into the q-next deep neural network to obtain $\max_{a'_n(t+1)} Q(s'_n(t+1), a'_n(t+1))$ and a target estimated value $Q_{target}=r_n(t)+\gamma \max_{a'_n(t+1)} Q(s'_n(t+1), a'_n(t+1))$;

(6) randomly selecting M experiences from the experience pool through an experience replay method; calculating $Q_{target}$ and $\max_{a_n(t)} Q(s_n(t), a_n(t))$ of each experience, and updating parameters w and b of the q-eval deep neural network according to a mean square error loss function $$Loss(\theta(t)) = \frac{\sum_{t=1}^{M}(Q_{target}(\theta(t)) - \max_{a_n(t)} Q(s_n(t), a_n(t), \theta(t)))^2}{M}$$

and gradient descend $$\theta_n(t+1) = \theta_n(t) - \eta \frac{\partial Loss(\theta(t))}{\partial(\theta(t))},$$

wherein θ represents the learning rate of the neural network, and θ(t) represents a neural network hyper-parameter of the time slot t;

(7) copying the parameters w and b of the q-eval deep neural network to the q-next deep neural network after repeatedly iterating the q-eval deep neural network for I times; and (8) repeatedly iterating (1)-(7) until the mean square error loss function converges, and using the obtained q-eval deep neural network as the trained neural network model.

6. The industrial 5G dynamic multi-priority multi-access method based on deep reinforcement learning according to claim 1, wherein, after the trained neural network model is obtained, the neural network model is optimized by:

collecting the state information of historical time slots of all the industrial 5G terminals in the industrial 5G network, and obtaining a multi-priority channel allocation result through the neural network model;

using the neural network model as a final trained neural network model for final multi-priority channel allocation when the network performance of the allocation result meets the requirements, in which the packet loss ratio, the system global packet loss ratio and the end-to-end latency are less than corresponding network performance indexes; or repeating step 1 and step 2 until the neural network model meets the requirements.

7. The industrial 5G dynamic multi-priority multi-access method based on deep reinforcement learning according to claim 6, wherein the network performance indexes comprise:

the packet loss ratio $$\rho_n^c(t) = \lambda_n^c(t) \frac{\hat{l}_n^c(t) - \vec{l}_n^c(t)}{\hat{l}_n^c(t)},$$

wherein $\lambda_n^c(t)$ represents whether channel c is allocated to the industrial 5G terminal n in the time slot t, $\lambda_n^c(t)$ is relevant to the priority p of the industrial 5G terminal n, $\hat{l}_n^c(t)$ represents the number of data packets to be transmitted by the industrial 5G terminal n on the channel c at the beginning of the time slot t, and $\vec{l}_n^c(t)$ represents the number of data packets successfully transmitted by the industrial 5G terminal n on the channel c at the end of the time slot t; and the system overall packet loss ratio $$\rho(t) = \frac{\sum_{n=1}^{N}(\hat{l}_n(t) - \bar{l}_n(t))}{\sum_{n=1}^{N}(\hat{l}_n(t))},$$

wherein $$\sum_{n=1}^{N} \bar{l}_n(t)$$

represents the number of data packets successfully transmitted by all N industrial 5G terminals in time slot t and $$\sum_{n=1}^{N} \hat{l}_n(t)$$

represents the number of data packets waiting for transmission by all N industrial 5G terminals in the time slot t, and the end-to-end latency defined as $D_n^{e2e} = d_n^{prop} + d_n^{tran} + d_n^{que} + d_{hw}$, wherein $d_n^{prop}$ is defined as the propagation latency of the industrial 5G terminal n, and is the latency experienced by electromagnetic waves from a sending end of one industrial 5G terminal to a receiving end of another industrial 5G terminal, $d_n^{tran}$ is defined as the transmission latency of the industrial 5G terminal n, and is the latency experienced from the transmission of the first bit of the data packet to the transmission of the last bit, $d_n^{que}$ is defined as the queuing latency of the industrial 5G terminal n, and is the latency experienced by the data packet from arrival at the industrial 5G terminal to departure from the industrial 5G terminal, and $d_{hw}$ is defined as hardware latency, the latency caused by the hardware performance of the industrial 5G terminal.

8. The industrial 5G dynamic multi-priority multi-access method based on deep reinforcement learning according to claim 1, wherein the step of collecting the state information of all the industrial 5G terminals in the current industrial 5G network as the input of the neural network model and conducting multi-priority channel allocation through the neural network model comprises the following steps:

collecting the state vector $$\sum_{n=1}^{N} s_n(t) = [s_1(t), s_2(t), \ldots, s_{N-1}(t), s_N(t)]$$

of all N industrial 5G terminals in the industrial 5G network in the current time slot t as the input of the trained neural network model to obtain an output action vector $$\sum_{n=1}^{N} a_n(t) = [a_1(t), a_2(t), \ldots, a_{N-1}(t), a_N(t)];$$

and scheduling an industrial 5G terminal access channel by an industrial base station according to the obtained output action vector.

* * * * *